United States Patent [19]
Atzet

[11] Patent Number: 5,473,811
[45] Date of Patent: Dec. 12, 1995

[54] APPARATUS AND METHOD FOR STRIPING INSULATED WIRE

[76] Inventor: Robert J. Atzet, 1800 Joyce Dr., Palm Springs, Calif. 92262

[21] Appl. No.: 215,031

[22] Filed: Mar. 18, 1994

[51] Int. Cl.$^6$ .............................. H01R 43/00; H02G 1/12
[52] U.S. Cl. .............................. 29/825; 29/33 F; 29/33 M; 81/9.51
[58] Field of Search ........................... 29/828, 825, 33 F, 29/33 M; 81/9.51

[56] References Cited

U.S. PATENT DOCUMENTS

| | | | |
|---|---|---|---|
| 2,882,188 | 4/1959 | Levin et al. | 81/9.51 X |
| 3,363,309 | 1/1968 | Logan et al. | 81/9.51 X |
| 3,748,932 | 7/1973 | Neiman et al. | 81/9.51 |
| 4,091,695 | 5/1978 | Funcik et al. | 81/9.51 |
| 4,199,854 | 4/1980 | Bitting et al. | 81/9.51 X |
| 4,281,444 | 8/1981 | Smith | 81/9.51 X |

Primary Examiner—Carl J. Arbes
Attorney, Agent, or Firm—John J. Connors; Connors & Associates

[57] ABSTRACT

Disclosed is an apparatus 1 for removing insulation from wire 5 where the insulation 21 surrounds a wire core 20. This apparatus 1 includes a mounting fixture 3 for holding a spool 4 of wire 5 in a manner that enables the wire to be unwound from the spool. As the wire 5 is continually unwound from the spool 4 it is wound around a conically shaped, rotatable mandrel 7. A manually adjustable knife blade 23 disposed between the mounting fixture 3 and the mandrel 7 engages the wire 5 as the wire is unwound from the spool 4 and wound around the mandrel. The knife blade 23 is positioned essentially at a tangent to the wire core 20 so that it cuts the insulation 21 into sections, one section 43 riding over the blade as the wire 5 is wound around the mandrel 7 and the other section 44 of insulation remaining on the wire core after the wire engages the knife blade. A stripper 9 is disposed between the knife blade 23 and the mandrel 7 that strips the section 44 of insulation 21 from the wire 5 prior to the wire being wound around the mandrel.

15 Claims, 3 Drawing Sheets

APPARATUS AND METHOD FOR STRIPING INSULATED WIRE

BACKGROUND OF THE INVENTION

1. Field of the Invention

This invention relates to an apparatus and method for removing insulation from electrical wire.

BACKGROUND DISCUSSION

Frequently when electricians electrically wire a building, there are remnants of electrically insulated wire leftover, which can be recycled. These remnants are usually wound around spools. This wire consists of a core, typically copper metal, surrounded with an insulation material of plastic, rubber and the like. The core may be fine metal strands twisted together or a solid, unitary, elongated cylinder. The salvage value of these remnants is substantially increased if the insulation is removed. Various devices have been suggested for accomplishing this as illustrated in the following patents: U.S. Pat. Nos. 1,787,658; 1,831,115; 2,391,721; 2,871,740; 2,880,635; 2,882,188; and 3,136,045.

SUMMARY OF THE INVENTION

The apparatus of this invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its advantages, which include simplicity of use and adjustability to accommodate different size wires.

The first feature of this invention is a mounting fixture for holding a spool of wire in a manner that enables the wire to be unwound from the spool. Typically, the wire is a standard #10 size (i.e., approximately ⅛ inch diameter wire core and ¹⁄₁₆ inch thick insulation surrounding the core), or smaller. The wire moves along a predetermined path past a knife blade and stripper member which removes severed insulation from the wire. The stripped wire is wound around a mandrel element. Preferably, an alignment member disposed between the mounting fixture and the mandrel element aligns the wire to move along the predetermined path.

The second feature is that the mandrel element is adapted to be rotated. An end portion of the wire being unwound from the spool is attached to the mandrel element, so that as the mandrel element is rotated the wire is continually unwound from the spool and wound around the mandrel element. The end portion of the wire is first stripped manually of insulation prior to being attached to the mandrel element. The mandrel element preferably has the general configuration of a truncated, tapered cone having an exterior wall with a slot in an end of the wall for receiving the stripped end portion of the wire. There is a hollow interior near this end of the wall, with a finger member positioned to engage the wire attached to the mandrel element to hold the wire securely to the mandrel element. The mandrel element may be either motor driven or manually driven.

The third feature is that the knife blade is manually adjustable. This blade is disposed between the mounting fixture and the mandrel element to engaged the wire as the wire is unwound from the spool and wound around the mandrel element. In accordance with one important aspect of this invention, there is a mounting mechanism for the knife blade that enables the blade to be moved in pitch and yaw directions and up and down vertically relative to the wire. The knife blade is positioned essentially at a tangent to the wire core, so that the blade cuts the insulation into first and second sections. The blade either contacts the wire core or is spaced a slight distance from the core, but close enough to the core to insure that the severed insulation exposes the wire core. The first section of insulation moves past the blade, riding over the blade as the wire is wound around the mandrel element. The second section of insulation remains on the wire core after the wire engages the knife blade. The stripper member is disposed between the knife blade and the mandrel element for stripping the second section of insulation from the wire prior to the wire being wound around the mandrel element.

The fourth feature is a compression member positioned in advance of the knife blade which straightens the wire as the wire is unwound from the spool and wound around the mandrel element. The compression member includes an anvil member and a guide member overlying the anvil member. A spring member applies a compressive force to the guide member, pressing this guide member firmly against the anvil member. The guide member has an elongated groove therein having a diameter about equal to the diameter of the wire with the insulation thereon. The guide member preferably is removably mounted so that alternate guide members with grooves of different diameters may be substituted to correspond to the diameter of the wire being stripped of insulation.

This invention also includes a method of removing insulation from a wire core. The method comprises (a) moving the insulted wire along a predetermined path
  (i) first past a knife blade having adjustable positions as determined by the diameter of the wire with the insulation thereon,
  (ii) next past a stripper member, and
  (iii) finally wrapping the wire with the insulation removed around a mandrel element, and (b) adjusting the position of the knife blade so that said knife blade is essentially at a tangent to the wire core so that said knife blade cuts the insulation into first and second sections, the first section of insulation moving past the blade as the wire moves along said predetermined path and the second section of insulation remaining on the wire core after the wire engages the knife blade, with said stripper member stripping the second section of insulation from the wire prior to the wire being wound around the mandrel element.

DESCRIPTION OF THE DRAWING

The preferred embodiment of this invention, illustrating all its features, will now be discussed in detail. This embodiment depicts the novel and non-obvious method and device of this invention shown in the accompanying drawing, which is for illustrative purposes only. This drawing includes the following figures (FIGS.), with like numerals indicating like parts.

DESCRIPTION OF THE PREFERRED EMBODIMENT

Figure 1:
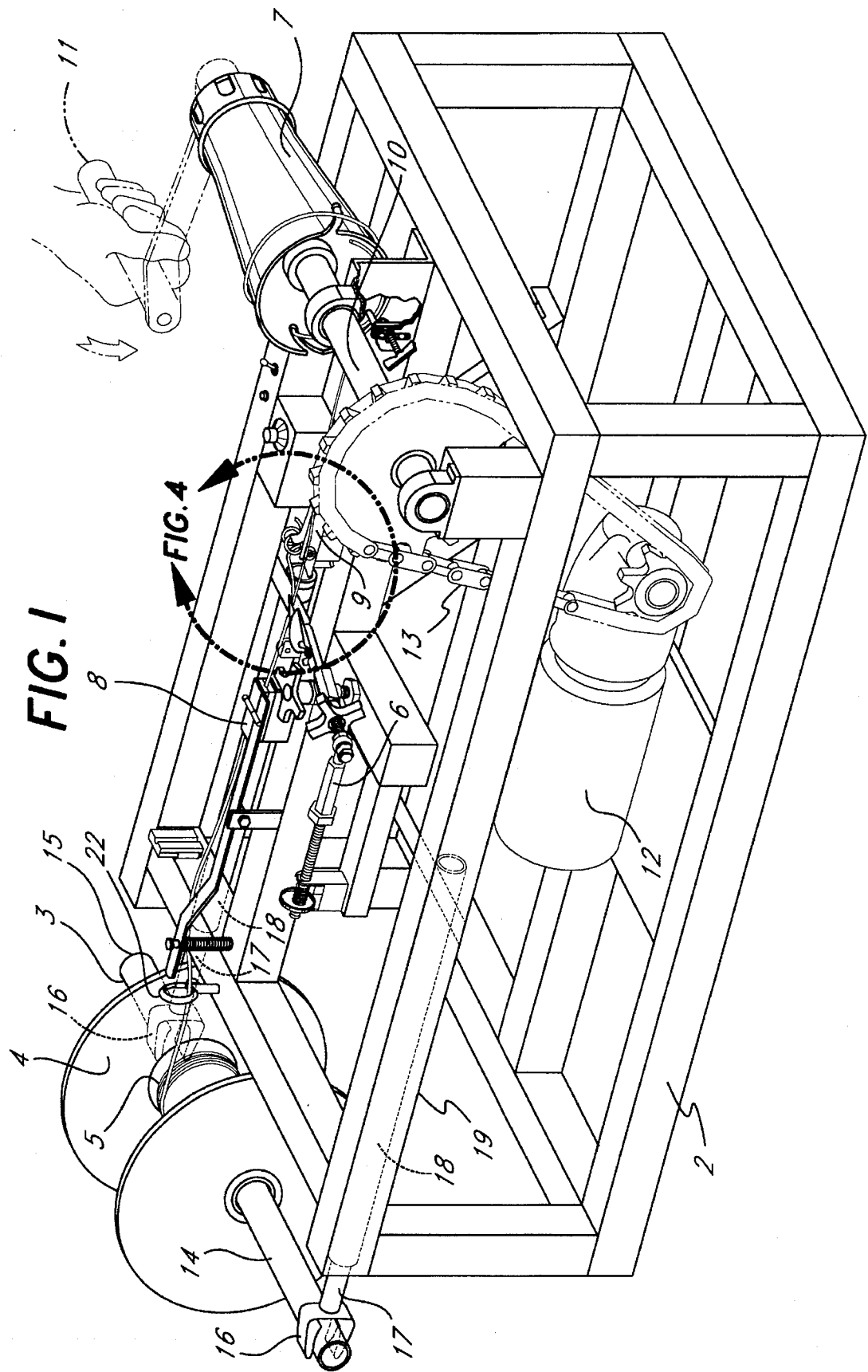
FIG. 1 is a perspective view of the wire stripping apparatus of this invention.
Figure 2:
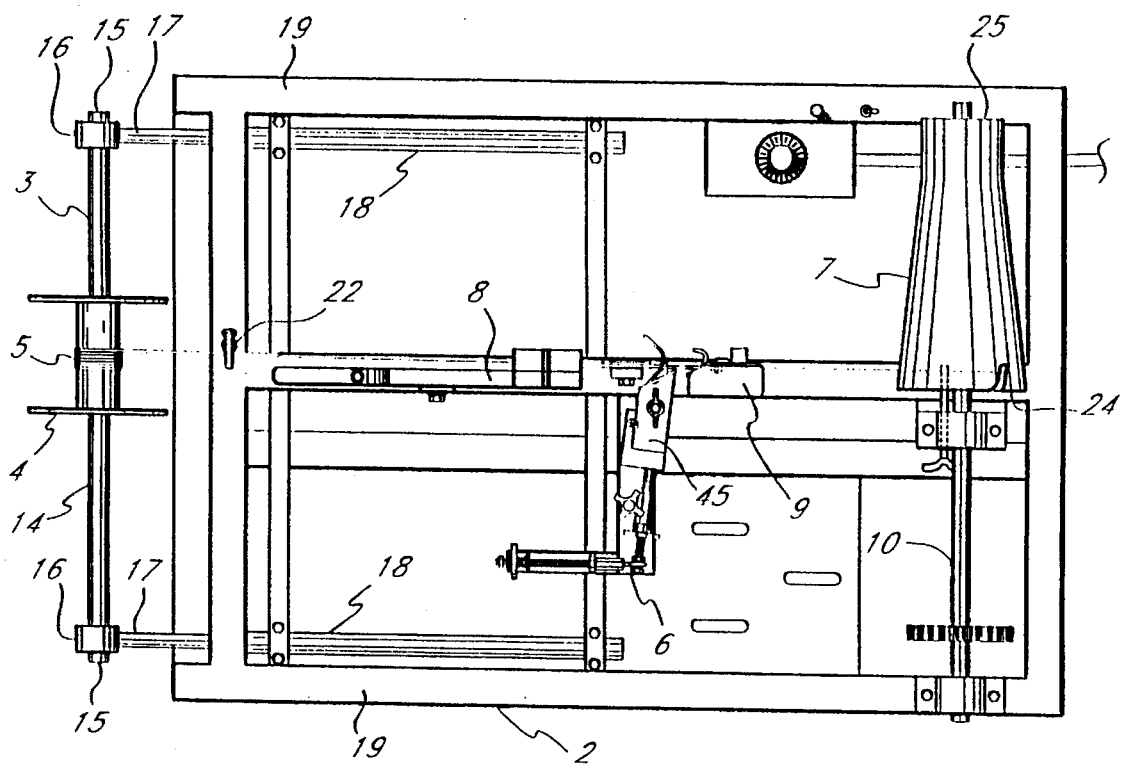
FIG. 2 is a plan view of the wire stripping apparatus of this invention.

As best shown in FIGS. 1 and 2, the wire stripping apparatus 1 of this invention includes a frame 2 on which are mounted a spool holder 3 which holds a spool 4 of insulated wire 5, a knife blade positioning mechanism 6, and a mandrel 7 used to roll up the wire 5 which has been stripped of its insulation.

Disposed in advance of the knife blade positioning mechanism 6 is a compression unit 8 which straightens the wire 5 as it is unwound from the spool 4 to remove any kinks in the wire 5 prior to being advanced to the knife blade mechanism 6. Disposed between the knife blade positioning mechanism 6 and the mandrel 7 is a stripper element 9 which removes insulation from the wire 5 after the insulation has been severed by the knife. The mandrel 7 is mounted on a drive shaft 10 for rotation by either manually using the hand crank 11 as shown in dotted lines in FIG. 1 or by an electric motor 12 and sprocket drive 13 shown in solid lines in FIG. 1.

Figure 5:
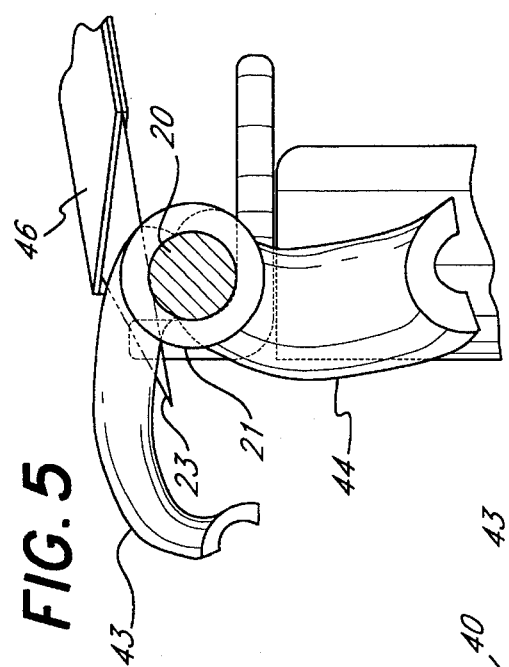
FIG. 5 is a view looking at the wire being stripped from the position depicted along line 5—5 of FIG. 4.

The spool holder 3 comprises a rod 14 which is held by its opposed ends 15 in clamps 16 that are attached to the ends of arms 17 that are telescopically received in tubes 18 mounted adjacent the inside of opposed frame elements 19 in the top of the frame 2. Thus the rod 14 may be manually pulled from the clamps 16 and a spool 4 placed on the spool rod 14 and the rod 14 remounted as shown in FIGS. 1 and 2. The arms 17 may be pulled from the tubes 18 a predetermined distance to enable the rod 14 to accommodate spools 4 of relatively large diameters. The wire 5 is rapped around the spool 4 and has a metal, for example, copper core 20 (FIG. 5). This core 20 is surrounded by the insulation material 21 which is to be stripped away.

Figure 3:
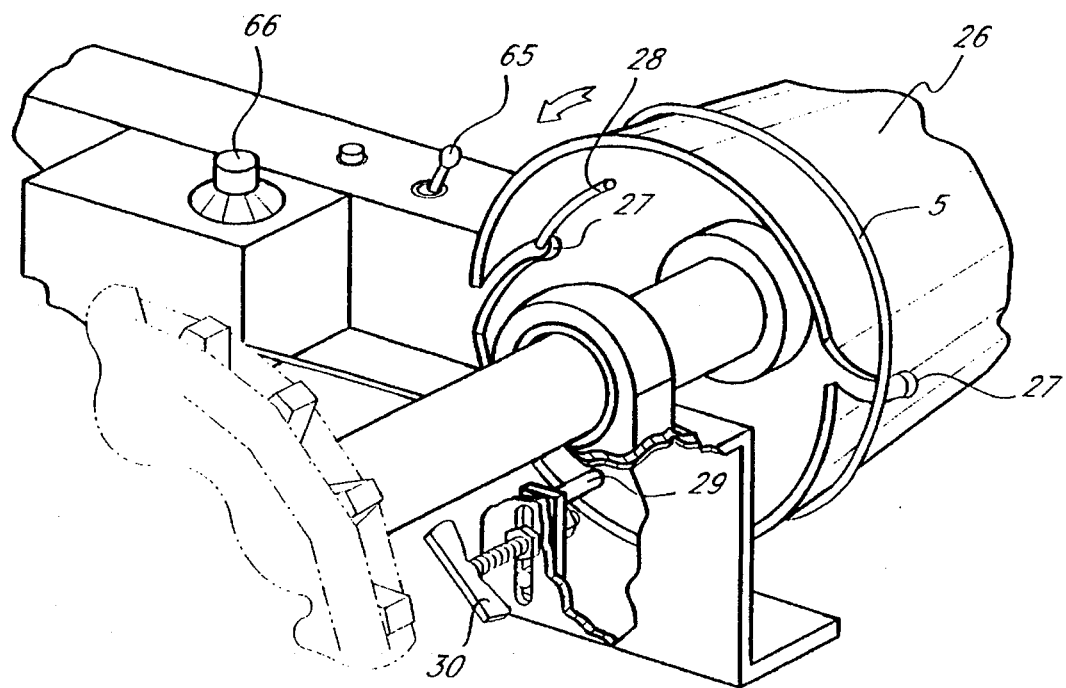
FIG. 3 is an enlarged perspective view showing a stripped end of the wire attached to the mandrel used in the wire stripping apparatus of this invention.

The end of the insulated wire 5 on the spool 4 is first manually stripped of the insulation 21 and then fed through a snap ring 22 into the compression unit 8 past the knife blade 23 and the stripper element 9. This stripped end is then manually attached to the mandrel 7. The mandrel 7 has a generally conical configuration, with the interior of the mandrel 7 being hollow at the inside end 24 of the mandrel 7. The drive shaft 10 passes through the mandrel 7 and extends from the outer end 25 to allow the hand crank 11 to be manually attached to the drive shaft 10 and rotated in a counter clockwise direction as indicated by the arrow in FIG. 1. As best shown in FIG. 3, the wall 26 of the mandrel 7 has slots 27 in it that allow the wire 5 to be wrapped around the exterior of the mandrel 7, with the stripped free end 28 of the wire 5 slipped into one of the slots 27 and pressed against the interior of the wall 27 near the inside end 24 of the mandrel 7. A manually adjustable finger element 29 engages the end of the wire 5, bending the wire inward against the interior surface of the wall 27 of the mandrel 7. This holds the end of the wire 5 to the mandrel 7. A screw type knob 30 allows this finger 29 to be moved towards or away from the interior surface of the wall 27 as required by the diameter of the core 20 of the wire 5 being wound around the mandrel 7.

Figure 4:
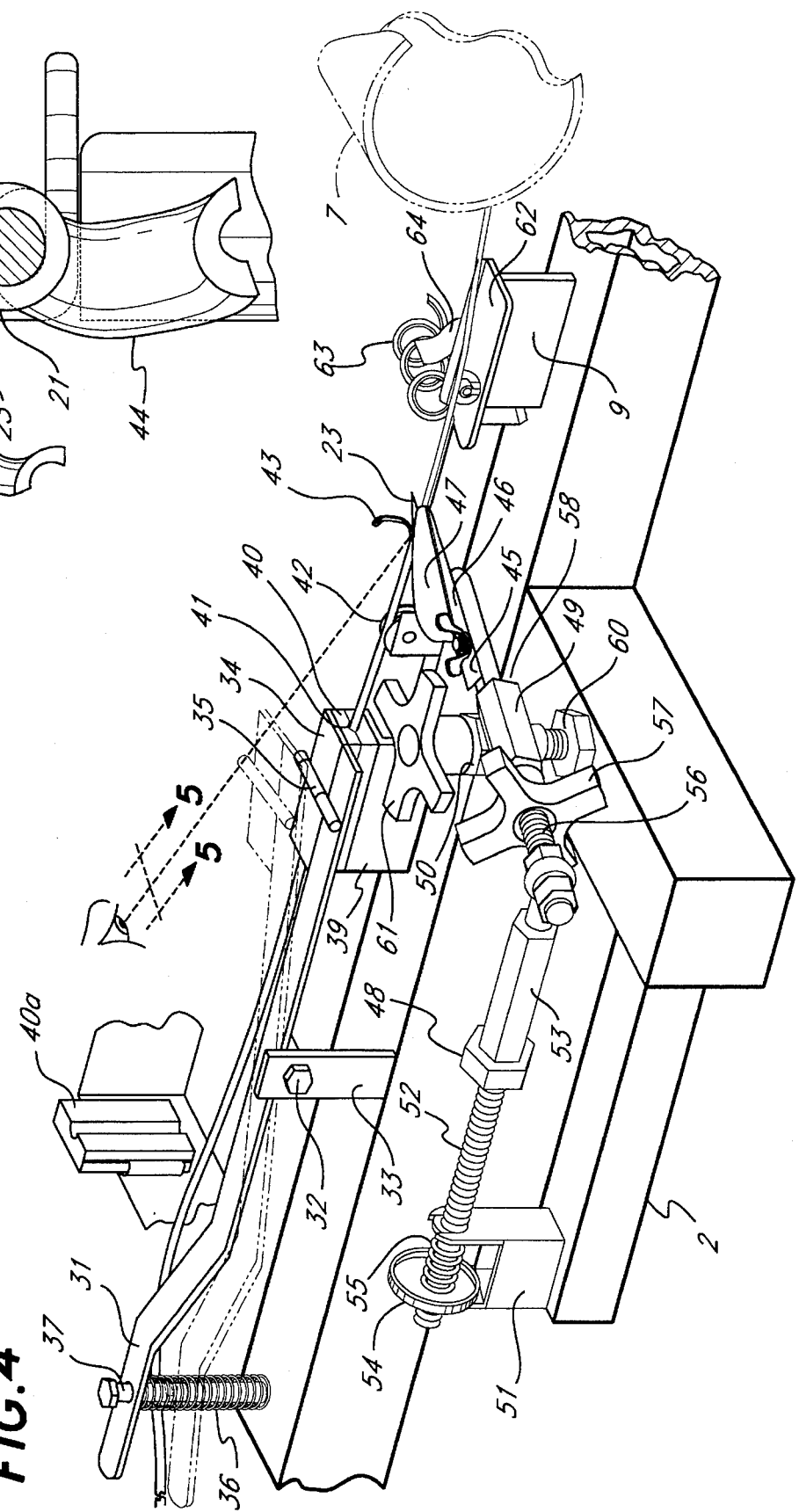
FIG. 4 is an enlarged perspective view of the blade positioning mechanism used in the wire stripping apparatus of this invention.

As best shown in FIG. 4, the compression unit 7 includes a lever arm 31 pivotally mounted to a pivot pin 32 attached to an intermediate wall bracket 33 carried on the frame 2. A guide member bracket 34 is attached by a hinge 35 to the one end of the lever arm 31 and a coiled spring 36 on a spring rod 37 is attached to the other end of the lever arm 31. When the lever arm 31 is pressed downward as shown in the dotted lines in FIG. 4, the coil spring 36 is compressed and the free end of the rod 37 bears against the frame 2. When the lever arm 31 is released, the coiled spring 36 pushes upward against the end of the lever arm 31 to cause the lever arm 31 to pivot about the pivot pin 32, causing the guide member bracket 34 to press downward against an anvil 39 immediately beneath it. The guide member bracket 34 carries a guide member 40 having an elongated groove 41 in it that is disposed in alignment with the path that the wire 5 travels between the spool holder 3 and mandrel 7. The guide member 40 is removably attached to the bracket 34 so that it can be slipped from the bracket 34 and a substitute guide member 40a inserted to accommodate wires of different diameters. The diameter of the groove 41 in the guide member 40 is essentially equal to the diameter of the copper core 20 with the insulation 21 on it. Thus, as the wire 5 travels along the groove 41 between the guide member 40 and the anvil 39, it is straightened. An alignment pulley 42 in advance of the knife blade 23 aligns the copper core 20 with the knife blade 23.

As depicted best in FIG. 5, the knife blade positioning mechanism 6 is designed to allow the knife blade 23 to cut the insulation 21 on the wire 5 into two segments, an upper section 43 and a lower section 44. The knife blade 23 is positioned essentially at a tangent to the copper core 20 so that the blade 23 cuts the insulation 21 into the two sections. The upper section 43 of severed insulation 21 rides over the blade 23 as the wire 5 moves towards the mandrel 7. The lower section 44 remains attached to the wire 5 until it engages the wire stripper 9. The knife blade 23 is attached to a knife holder 45 by means of a removable cover 46 which includes a flange 47 that directs the upper section 43 of the insulation 21 away from the knife blade 23.

In accordance of this invention, the knife blade 23 may have its yaw position or pitch position manually adjusted and its vertical height relative to the copper core 20 raised or lowered manually. This is accomplished by three different control mechanisms. The yaw control member 48, the pitch control member 49, and the vertical control member 50.

The yaw control member 48 includes a bracket 51 attached to the frame 2, a screw element 52 carried by the bracket 51, and a receptacle 53 which receives the screw element 52. There is a dial 54 disposed between the opposed walls of the bracket 51 with a spring 55 having one end bearing against one wall of the bracket 51 and another end bearing against the dial 54. The receptacle 53 has an end attached to a screw element 56 of the pitch control member 49. The pitch control member 49 includes a screw element 56, a knob 57 having a threaded interior, and a receptacle 58 for the screw element 56. The knife holder 45 is attached to the free end of the screw element 56. By rotating the dial 54 in a clockwise or counter-clockwise direction the screw element 52 and the receptacle 53 move as a unit to either pulls the end of the screw element 56 towards the bracket 51 or pushes this screw element away from the bracket. By turning the knob 57, one loosens the screw element 56 within the receptacle 58, so that the knife blade's 23 pitch angle relative to the wire 5 can be changed. The receptacle 58 has a threaded section through which a screw element 60 passes that has a knob 61 attached to its one end. By turning the knob 61, the screw element 60 rotates to cause the receptacle 58 to be raised or lowered, raising or lowering the knife blade 23.

The stripper element 9 includes a plate 62 having a lip 63 and a tongue 64 on the outside of the lip 63. As the wire 5 moves past the blade 23 carrying with it the lower section 44 of insulation 21, the lower section 44 of insulation 21 engages the plate 62 and lip 63, so that it is stripped away from the wire core 20. The tongue 64 directs the lower section 44 of insulation 21 away from the stripper element 9. Thus the wire 5 is stripped of the insulation 21 prior to being wound about the mandrel 7.

The electric motor 12 has its on/off switch 65 mounted to the frame 2 with a variable speed control dial 66 used to regulate the rate at which the mandrel 7 is rotated.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention.

I claim:

1. A method of removing insulation from a wire core, comprising
    (a) moving the insulted wire along a predetermined path
       (i) first past a knife blade having adjustable positions as determined by the diameter of the wire with the insulation thereon,
       (ii) next past a stripper member, and
       (iii) finally wrapping the wire with the insulation removed around a mandrel element, and
    (b) adjusting the position of the knife blade so that said knife blade is essentially at a tangent to the wire core so that said knife blade cuts the insulation into first and second sections, the first section of insulation moving past the blade as the wire moves along said predetermined path and the second section of insulation remaining on the wire core after the wire engages the knife blade, with said stripper member stripping the second section of insulation from the wire prior to the wire being wound around the mandrel element.

2. The method of claim 1 where the wire is carried on a spool, and the wire is unwound from the spool as said wire moves along said predetermined path.

3. The method of claim 1 where the wire with the insulation thereon is straightened prior to engaging the knife blade.

4. The method of claim 1 where the wire with the insulation thereon has a diameter ranging between 0.062 and 0.500 inches, and the wire core has a diameter ranging between 0.031 and 0.250 inches.

5. Apparatus for removing insulation from wire where the insulation surrounds a wire core, including
    a support structure,
    a mounting fixture mounted to the support structure for holding a spool of wire in a manner that enables the wire to be unwound from the spool,
    a mandrel element mounted to the support structure and adapted to be rotated, a portion of the wire being unwound from the spool and an end of the unwound wire being attached to said mandrel element, so that as the mandrel element is rotated the wire is continually unwound from the spool and wound around the mandrel element,
    a manually adjustable knife blade disposed between the mounting fixture and the mandrel element to engaged the wire as said wire is unwound from the spool and wound around the mandrel element, said knife blade being positioned essentially at a tangent to the wire core so that said knife blade cuts the insulation into first and second sections, the first section of insulation riding over the blade as the wire is wound around the mandrel element and the second section of insulation remaining on the wire core after the wire engages the knife blade,
    an alignment member disposed between the mounting fixture and the mandrel element for aligning the wire to move along predetermined path past the knife blade, and
    a stripper member disposed between the knife blade and the mandrel element that strips the second section of insulation from the wire prior to the wire being wound around the mandrel element.

6. The apparatus of claim 5 including a compression member positioned in advance of the knife blade which straightens the wire as said wire is unwound from the spool and wound around the mandrel element.

7. The apparatus of claim 6 where the compression member includes an anvil member and a guide member overlying the anvil member, said guide member having an elongated groove therein having a diameter about equal to the diameter of the wire with the insulation thereon.

8. The apparatus of claim 7 where the guide member is removably mounted so that alternate guide members with grooves of different diameters may be substituted to correspond to the diameter of the wire being stripped of insulation.

9. The apparatus of claim 8 including a spring member which applies a compressive force to the guide member, pressing said guide member firmly against the anvil member.

10. The apparatus of claim 5 where the mandrel element is motor driven.

11. The apparatus of claim 1 where the mandrel element is manually driven.

12. Apparatus for removing insulation from wire where the insulation surrounds a wire core, including
    supporting structure,
    means attached to the supporting structure that enables the wire to be moved along a predetermined path,
    a mandrel element mounted to the support structure and adapted to be rotated, an end of the wire being attached to said mandrel element, so that as the mandrel element is rotated the wire is continually moved along said predetermined path and wound around the mandrel element,
    a manually adjustable knife blade disposed along said predetermined path to engage the wire, said knife blade being positioned essentially at a tangent to the wire core so that said knife blade cuts the insulation into first and second sections, the first section of insulation riding over the blade as the wire moves along said predetermined path and the second section of insulation remaining on the wire core after the wire engages the knife blade, a compression member positioned in advance of the knife blade which straightens the wire as said wire is unwound from the spool and wound around the mandrel element, said compression member including an anvil member and a guide member overlying the anvil member, said guide member having an elongated groove therein having a diameter about equal to the diameter of the wire with the insulation thereon, said guide member being removably mounted so that alternate guide members with grooves of different diameters may be substituted to correspond to the diameter of the wire being stripped of insulation, a spring member which applies a compressive force to the guide member, pressing said guide member firmly against the anvil member, a stripper member disposed between the knife blade and the mandrel element that strips the second section of insulation from the wire prior to the wire being wound around the mandrel element, and a mounting mechanism for the knife blade that enables said blade to be moved in pitch and yaw directions and raised and lowered relative to the wire.

13. The apparatus of claim 12 including an alignment member disposed between the mounting fixture and the mandrel element for aligning the wire to move along a predetermined path past the knife blade.

14. Apparatus for removing insulation from wire where the insulation surrounds a wire core, including a support structure, a mounting fixture mounted to the support structure for holding a spool of wire in a manner that enables the wire to be unwound from the spool, a mandrel element mounted to the support structure and adapted to be rotated, a portion of the wire being unwound from the spool and an end of the unwound wire being attached to said mandrel element, so that as the mandrel element is rotated the wire is continually unwound from the spool and wound around the mandrel element, said mandrel element having the general configuration of a tapered cone with an exterior wall with a slot in an end of the wall for receiving the end of the wire and a hollow interior near said end of the wall, with a finger member positioned to engage the wire attached to the mandrel element for bending the wire so that the wire is attached to the mandrel, a manually adjustable knife blade disposed between the mounting fixture and the mandrel element to engaged the wire as said wire is unwound from the spool and wound around the mandrel element, said knife blade being positioned essentially at a tangent to the wire core so that said knife blade cuts the insulation into first and second sections, the first section of insulation riding over the blade as the wire is wound around the mandrel element and the second section of insulation remaining on the wire core after the wire engages the knife blade, and a stripper member disposed between the knife blade and the mandrel element that strips the second section of insulation from the wire prior to the wire being wound around the mandrel element.

15. Apparatus for removing insulation from wire where the insulation surrounds a wire core, including a support structure, a mounting fixture mounted to the support structure for holding a spool of wire in a manner that enables the wire to be unwound from the spool, a mandrel element mounted to the support structure and adapted to be rotated, a portion of the wire being unwound from the spool and an end of the unwound wire being attached to said mandrel element, so that as the mandrel element is rotated the wire is continually unwound from the spool and wound around the mandrel element, a manually adjustable knife blade disposed between the mounting fixture and the mandrel element to engaged the wire as said wire is unwound from the spool and wound around the mandrel element, said knife blade being positioned essentially at a tangent to the wire core so that said knife blade cuts the insulation into first and second sections, the first section of insulation riding over the blade as the wire is wound around the mandrel element and the second section of insulation remaining on the wire core after the wire engages the knife blade, a mounting mechanism for the knife blade that enables the blade to be moved in pitch and yaw directions and raised and lowered relative to the wire, and a stripper member disposed between the knife blade and the mandrel element that strips the second section of insulation from the wire prior to the wire being wound around the mandrel element.

* * * * *